(No Model.)
J. M. DYER.
WAVE POWER.
No. 597,553. Patented Jan. 18, 1898.
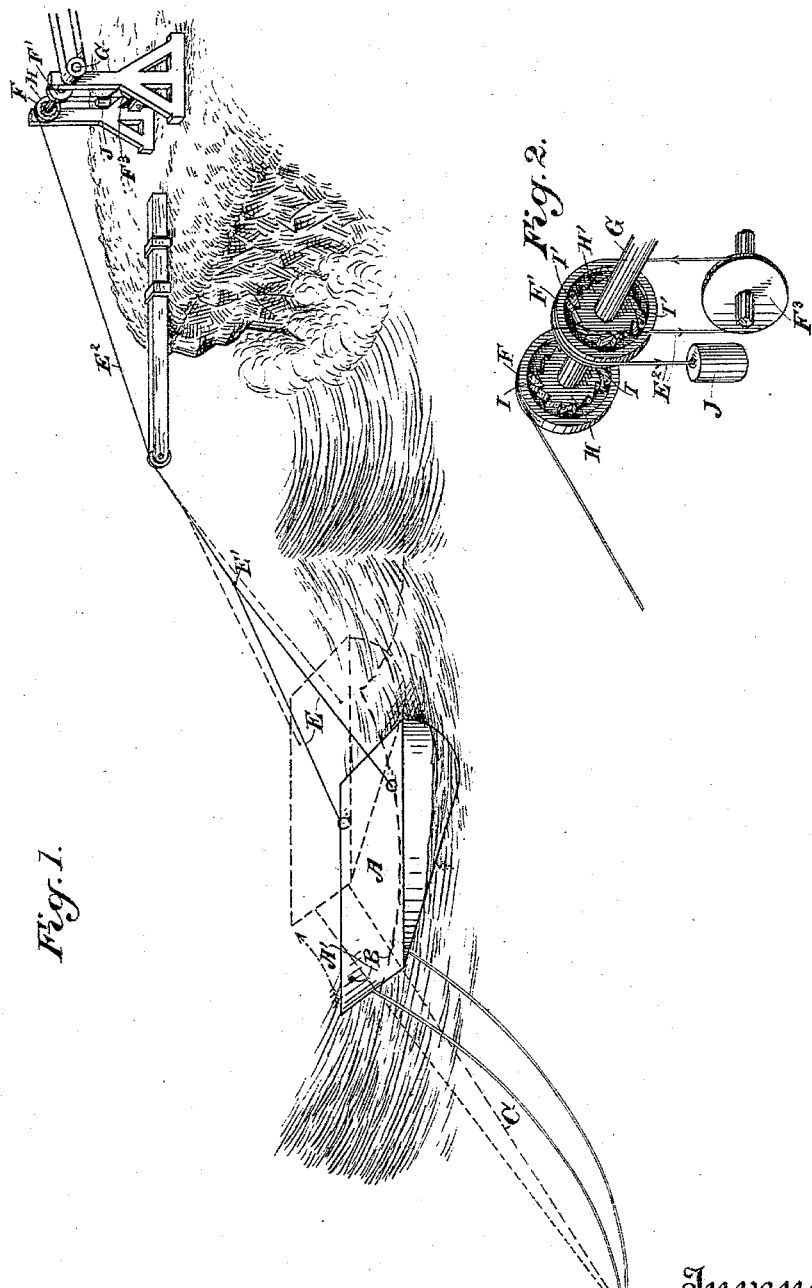
Witnesses,
Inventor,
James M. Dyer

UNITED STATES PATENT OFFICE.

JAMES M. DYER, OF SAN FRANCISCO, CALIFORNIA.

WAVE-POWER.

SPECIFICATION forming part of Letters Patent No. 597,553, dated January 18, 1898.

Application filed April 10, 1897. Serial No. 631,493. (No model.)

*To all whom it may concern:*

Be it known that I, JAMES M. DYER, a citizen of the United States, residing in the city and county of San Francisco, State of California, have invented an Improvement in Wave-Powers; and I hereby declare the following to be a full, clear, and exact description of the same.

My invention relates to a novel means for applying the motion and power of the waves and in transmitting this motion and converting it into a rotary motion which may be applied to machinery for various purposes.

In the accompanying drawings, Figure 1 is a view of my device, showing its application. Fig. 2 is a detail of the power-transmitting device.

In a former patent issued to me September 21, 1891, No. 460,371, I have shown an apparatus consisting of an anchored float with a fulcrumed framework caused to oscillate by the rise and fall of the waves acting upon the float, and in another application for which Letters Patent were allowed to me December 1, 1896, I have shown the float having a rigid arm or beam projecting outwardly from a universal joint, about which it is movable, and guy ropes or chains by which the float is anchored, so as to prevent its swinging to either side. Other constructions of floats designed to utilize the motion of the waves necessitate the employment of guiding piles or frameworks, all of which are expensive and liable to be swept away by storms.

In my present invention I have simplified my apparatus by employing a float having a single anchor or attachment, by which it is retained in position, and a single rope extending diagonally therefrom to a stationary mechanism on shore, through which the power is applied by the combined rising-and-falling and forward-and-backward movement of the float caused by the waves, and the method of attaching and connecting the parts.

In my present construction, A is a float of sufficient buoyancy and considerable weight. This float may be made of any suitable or desired shape. In the present case I have shown it having a body deeper at one end than the other, gradually tapering or becoming thinner toward that end which will be connected with the anchor or fixed support, as shown at A'. In this end of the float I have shown one or more devices B for the attachment of the anchor chains or cables to the float. From these the flexible chains or lines C extend to a point where they are connected with an anchor or other fixed attachment, as at D. It will be seen that by this construction the float will be moved by the action of the waves, rising and swinging inwardly toward the shore when the wave strikes it and sinking and moving outwardly by the reflex action of the wave in curves somewhat resembling a crescent, as shown in dotted lines, while the two ropes C C will maintain the float approximately head on to the waves at all times.

To the rear portion of the float is connected the rope or ropes E, of which two are here shown. They converge from the point of attachment at opposite sides of this end of the float, uniting at E', thence extending as a single rope to the pulley F, over which the single rope $E^2$ passes. This pulley is mounted and turnable upon the shaft G and has a ratchet-wheel H, with pawl I, of the usual or any suitable construction, which is adapted to allow the wheel to turn freely in one direction and to connect it through the pawl and ratchet, so as to act upon and rotate the shaft G when turning in the opposite direction. Upon the same shaft G is another pulley F' and a similar pawl-and-ratchet mechanism H' I', which allows the pulley F' to turn freely in the opposite direction from the pulley F, but engages the pawls so as to turn the shaft G constantly in one direction. Journaled beneath and with relation to the pulleys F and F' is a pulley $F^3$. The rope $E^2$ passes over the pulley F, thence down beneath the pulley $F^3$, thence up over the pulley F' from the opposite side to that which it takes around the pulley F, thence downwardly to the weight J, which is suspended from its end. It will be seen that with this weight thus acting through the various pulleys it will keep the rope $E^2$ in a state of tension at all times.

The operation of the device will then be as follows: The movement of the float A will be essentially up and down in an arc caused by the rising and falling of the waves about the anchored point D as a center of motion; but the forward-and-backward or reflex action of the wave causes an alternate tension of the anchor-rope C when the float is swept inwardly, so that the rise and fall is approximately in the line of direction of the ropes E E², which connect with the mechanism upon the shore or other support. When the reflex or return action of the wave takes place, the float is again allowed to sink by its weight and at the same time to move outwardly toward the anchor-point, the anchor-rope C C being proportionately slackened by this movement. This produces a constant oscillation or swinging of the float toward and away from the mechanism on the shore through which the power is communicated, thus constantly causing the rope E² to move about the pulleys over which it passes and the weight J to be correspondingly raised and depressed by its movement. The movement of the float is maintained essentially in the direction to and from the mechanism by reason of the diverging anchor-ropes C and the corresponding diverging ropes E, connecting with the mechanism. I am thus enabled to dispense with all guides or guy-ropes or stays of any description, thus simplifying the mechanism to the least possible number of parts. When the float rises and moves toward the shore by the action of the waves, as previously described, the rope E², passing around the pulleys F F³ F', will allow the weight J to sink, and this motion causes one of the pulleys F F' to communicate its power through the ratchet-wheel H to the shaft G, while the pawl of the other one, moving freely over the teeth of its ratchet-wheel, will allow the shaft to turn without restriction. Whenever the wave recedes, the weight of the float A is sufficient to cause it to drag downward and backward with the return movement of the wave, and again pulling the rope E² over the pulleys F F' F³ the opposite action takes place—that is, the second of the pulleys F F' engages its pawl and ratchet, so as to continue the movement of the shaft G in the same direction, while the other pawl moves over its ratchet without engagement, the two thus alternately engaging the pawls and ratchets and continuing the motion of the shaft in a single direction.

Having thus described my invention, what I claim as new, and desire to secure by Letters Patent, is—

1. The combination with a float adapted to rise and fall by the movement of the waves, with a fixed point of anchorage, ropes diverging therefrom and connected with one end of the float at such distance apart as its width will allow, other ropes similarly connected with the opposite end of the float and uniting in a single member said ropes being inclined in substantially the same plane and in the line of movement of the waves whereby the float will be moved by the action of the waves so that it rises and also swings inward toward the shore when the waves strike it, and sinks and moves outward in curved lines by the reflex action of the wave, pulleys over which the shore-rope passes and a shaft on which the pulleys are mounted, said pulleys having ratchet mechanism by which they are alternately engaged with and disengaged from the shaft, an intermediate pulley over which the shore-rope passes between the pulleys on the shaft and a weight connected with the opposite end of the rope whereby the alternate movements of the float produce a movement of the shaft in one direction.

2. In a wave-power, the combination of a float, converging lines from each end thereof, one of said converging lines connecting with a fixed point of anchorage and the other uniting in a single member extending to the shore, said converging lines adapted to maintain the float approximately head on to the waves and said fixed anchorage forming a fulcrum about which the float rises and falls and moves in curved lines toward and from the shore without other guides, a driven shaft having pulleys over which the shore-line passes and pawl-and-ratchet mechanism by which the alternate reciprocating movements of the shore-line are converted into continuous rotary motion, and a weight attached to the free end of the shore-line.

3. In a wave-power, the combination of a float, lines connected with opposite sides of each end and converging, and extending upwardly and approximately in the line of movement of the waves whereby the float has a rising-and-falling and inward-and-outward movement, said float being deeper at one end than the other and gradually tapering toward that end which is presented toward the fixed anchorage, and mechanism for transforming the reciprocating motion into a continuous rotary one.

In witness whereof I have hereunto set my hand.

JAMES M. DYER.

Witnesses:
S. H. NOURSE,
JESSIE C. BRODIE.